United States Patent
Duncan et al.

(10) Patent No.: US 7,284,077 B2
(45) Date of Patent: Oct. 16, 2007

(54) PERIPHERAL INTERFACE SYSTEM HAVING DEDICATED COMMUNICATION CHANNELS

(75) Inventors: Michael A. Duncan, Charlotte, NC (US); Jeffrey E. Journey, Concord, NC (US); Dennis D. Leak, Kannapolis, NC (US); Robert R. Plyler, Charlotte, NC (US); William W. Plyler, Matthews, NC (US); Clair F. Rohe, Huntersville, NC (US); Robert E. Shirley, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 10/661,288

(22) Filed: Sep. 12, 2003

(65) Prior Publication Data

US 2005/0060439 A1 Mar. 17, 2005

(51) Int. Cl.
G06F 3/00 (2006.01)
G06F 13/12 (2006.01)

(52) U.S. Cl. ............ 710/64; 710/2; 710/3; 710/37; 710/52

(58) Field of Classification Search ............ 710/2, 710/3, 7, 20, 37, 52, 62, 69, 72
See application file for complete search history.

(56) References Cited

U.S. PATENT DOCUMENTS

| | | | |
|---|---|---|---|
| 5,784,650 A * | 7/1998 | Gulick et al. | 710/62 |
| 5,809,261 A * | 9/1998 | Lambrecht | 710/306 |
| 5,991,824 A | 11/1999 | Strand et al. | |
| 6,134,622 A | 10/2000 | Kapur et al. | |
| 6,175,889 B1 | 1/2001 | Olarig | |
| 6,366,989 B1 * | 4/2002 | Keskar et al. | 711/167 |
| 6,487,628 B1 | 11/2002 | Duong et al. | |
| 6,496,740 B1 * | 12/2002 | Robertson et al. | 700/20 |
| 2002/0170951 A1 | 11/2002 | Oshins et al. | |
| 2002/0191599 A1 | 12/2002 | Parthasarathy et al. | |
| 2005/0038947 A1 * | 2/2005 | Lueck et al. | 710/315 |

FOREIGN PATENT DOCUMENTS

| | | |
|---|---|---|
| JP | 2000010912 A | 1/2000 |
| JP | 2003018188 A | 1/2003 |

(Continued)

OTHER PUBLICATIONS

"INFINIBAND: An End-User Perspective," Prepared by The Kent Row Group, date and source unknown, pp. 1-18.

(Continued)

Primary Examiner—Alan S. Chen
(74) Attorney, Agent, or Firm—Douglas A. Lashmit; Hoffman, Warnick & D'Alessandro, LLC

(57) ABSTRACT

A peripheral interface device that is adaptable into a computer system and which provides a communication interface for a plurality of external devices. The peripheral interface device comprises: a plurality of transfer control logic (TCL) modules, wherein each TCL module provides a dedicated interface for an associated one of the external devices, and wherein multiple TCL modules can communicate in parallel with their associated external devices; and a dual port memory (DPM) device that is in communication with an input/output bus of the computer system, wherein the DPM device can selectively communicate with each of the plurality of TCL modules.

32 Claims, 10 Drawing Sheets

FOREIGN PATENT DOCUMENTS

WO      WO 02/35367 A1      5/2002

OTHER PUBLICATIONS

Leddy, W., "InfiniBand Software: Design Matters," Lane 15 Software, Inc., v 1.0, Jun. 2001, pp. 1-9.

Paavola, S., "Embedded InfiniBand," A SKY Computers White Paper, www.skycomputers.com, date unknown.

Paavola, S., "InfiniBand Architecture Delivers Enhanced Reliability," A SKY Computers White Paper, www.skycomputers.com, date unknown.

Tanabe et al., "A Low Latency High Bandwidth Network Interface Prototype for PC Cluster," Int'l Workshop on Innovative Architecture for Future Generation High-Performance Processors and Systems, Jan. 10-11, 2002.

Tanabe et al., "A prototype of high bandwidth low latency network interface plugged into a DIMM slot," date and source unknown.

Duncan et al., "High Performance I/O Design In the AlphaServer 4100 Symmetric Multiprocessing System," Digital Tech. Journal, vol. 8, No. 4, updated Apr. 25, 1997, pp. 1-20.

Bouvier, D., "RapidIO: The Interconnect Architecture for High Performance Embedded Systems," www.rapidio.org, Jan. 2003, pp. 1-20.

Leroux, P., "Making the Switch to RapidIO: Using a Message-passing Microkernel OS to Realize the Full Potential of the RapidIO Interconnect," QNX Software Systems Ltd., 2002, pp. 1-11.

"The Lightning Data Transport I/O Bus Architecture," LDT Architecture White Paper Rev. 1001, Api NetWorks, Inc., 2000, pp. 1-18.

Lindenstruth, V., "Novel Intelligent I/O Architecture Eliminating the Bus Bottleneck," date and source unknown.

"Realizing the Full Potential of Server, Switch & I/O Blades with InfiniBand Architecture," White Paper, Mellanox Technologies, Inc., Dec. 2001, pp. 1-11.

Stigliani, Jr., et al., "IBM eServer z900 I/O Subsystem," IBM Journal of Research and Development, vol. 46, No. 4/5, Jul./Sep. 2002, pp. 421-445.

"Technology Background," Intelligent-IO.com, author and date unknown.

Rosdahl, J., "The I2O Host Environment," Novell, Inc., date and source unknown.

Easley, M., "Processor Independent I2O Solutions Using Shell and Private Platform," www.pixtech.com.

* cited by examiner

| OFFSET ADDRESS: | | |
|---|---|---|
| 00000h | TCL-1 READ REGISTERS | 0K |
| 04000h | TCL-1 WRITE REGION | 16K |
| 08000h | TCL-2 READ REGISTERS | 32K |
| 0C000h | TCL-2 WRITE REGION | 48K |
| 10000h | TCL-3 READ REGISTERS | 64K |
| 14000h | TCL-3 WRITE REGION | 80K |
| 18000h | TCL-4 READ REGISTERS | 96K |
| 1C000h | TCL-4 WRITE REGION | 112K |
| 20000h | MICR SAMPLE DATA STORAGE REGION A | 128K |
| 30000h | MICR SAMPLE DATA STORAGE REGION B | 192K |
| 40000h | TRANSFER CONTROL AND STATUS REGISTERS | 256K |
| 40400h | UNUSED REGION | 257K |
| | | 511K |

256K DUAL-PORTED SRAM

*FIG. 5*

WRITE TRANSFER RECORD START LOCATIONS

| TCL-1 WRITE REGIONS | TCL-2 WRITE REGIONS | TCL-3 WRITE REGIONS | TCL-4 WRITE REGIONS |
|---|---|---|---|
| 0 - 04000h | 0 - 0C000h | 0 - 14000h | 0 - 1C000h |
| 1 - 04400h | 1 - 0C400h | 1 - 14400h | 1 - 1C400h |
| 2 - 04800h | 2 - 0C800h | 2 - 14800h | 2 - 1C800h |
| 3 - 04C00h | 3 - 0CC00h | 3 - 14C00h | 3 - 1CC00h |
| 4 - 05000h | 4 - 0D000h | 4 - 15000h | 4 - 1D000h |
| 5 - 05400h | 5 - 0D400h | 5 - 15400h | 5 - 1D400h |
| 6 - 05800h | 6 - 0D800h | 6 - 15800h | 6 - 1D800h |
| 7 - 05C00h | 7 - 0DC00h | 7 - 15C00h | 7 - 1DC00h |
| 8 - 06000h | 8 - 0E000h | 8 - 16000h | 8 - 1E000h |
| 9 - 06400h | 9 - 0E400h | 9 - 16400h | 9 - 1E400h |
| A - 06800h | A - 0E800h | A - 16800h | A - 1E800h |
| B - 06C00h | B - 0EC00h | B - 16C00h | B - 1EC00h |
| C - 07000h | C - 0F000h | C - 17000h | C - 1F000h |
| D - 07400h | D - 0F400h | D - 17400h | D - 1F400h |
| E - 07800h | E - 0F800h | E - 17800h | E - 1F800h |
| F - 07C00h | F - 0FC00h | F - 17C00h | F - 1FC00h |

(DPM OFFSET ADDRESS)

DEVICE WRITE REGIONS:
REGION 0, REGION 1, REGION 2, REGION 3, REGION 4, REGION 5, REGION 6, REGION 7, REGION 8, REGION 9, REGION A, REGION B, REGION C, REGION D, REGION E, REGION F

FIG. 7

PERIPHERAL INTERFACE SYSTEM HAVING DEDICATED COMMUNICATION CHANNELS

BACKGROUND OF THE INVENTION

1. Technical Field

The present invention relates generally to peripheral interfaces for computer systems, and more specifically relates to a peripheral interface for communicating data with external devices via dedicated channels.

2. Related Art

Many systems utilize a centralized processor to receive, process, and communicate data to and from remote devices located throughout the system. In systems that perform high-speed functionality, data often must be communicated to and from peripheral devices at very high rates of speed, such that the processor can make quick control decisions.

One example of such a system is a check-sorting system. A typical high-speed check-sorting machine may be required to process 40 documents per second. During such processing, the system may be required to perform numerous interrelated tasks, including analyze checks to determine how they should be routed, take actions when errors occur, capture and process magnetic ink character recognition (MICR) based data, cause information to be printed onto checks, collect and analyze image data, etc. Because the peripheral devices needed to accomplish each of these tasks may reside at different remote locations within the system, a high speed and efficient system for communicating parallel data between a processor and the peripheral devices is critical.

Numerous peripheral interface systems exist that allow data to be communicated between a central processing unit and peripheral devices. However, none provide high-speed, low latency performance necessary for systems, such as the check-sorting machine described above. For instance, U.S. Pat. No. 6,487,628, issued on Nov. 26, 2002, entitled "Peripheral Component Interface with Multiple Data Channels and Reduced Latency over a System Area Network," which is hereby incorporated by reference, describes a peripheral control interface (PCI) that provides access to a system area network for a plurality of devices connected to the PCI via an I/O bus. In the system, devices are assigned to one of a plurality of channels for the particular transaction. Moreover, the system requires the host computer to interact with the peripheral device to communicate data. Thus, the teachings of this patent consume significant overhead, and would therefore not meet the real-time data communication needs described above.

Accordingly, a need exists for a peripheral interface that can provide high-speed, low latency parallel data communications between a plurality of peripheral devices and a central computer system.

SUMMARY OF THE INVENTION

The present invention addresses the above-mentioned problems, as well as others, by providing a peripheral interface having a plurality of channels, each dedicated to a specific external device. In a first aspect, the invention provides a peripheral interface device that is adaptable into a computer system and which provides a communication interface for a plurality of external devices, the peripheral interface device comprising: a plurality of transfer control logic (TCL) modules, wherein each TCL module provides a dedicated interface for an associated one of the external devices, and wherein multiple TCL modules can communicate in parallel with their associated external devices; and a dual port memory (DPM) device that is in communication with an input/output bus of the computer system, wherein the DPM device can selectively communicate with each of the plurality of TCL modules.

In a second aspect, the invention provides a computer system, comprising: a processing unit; a memory; an I/O bus coupled to the processing unit and memory; and a peripheral interface device which provides a communication interface for a plurality of external devices, wherein the peripheral interface device includes: a plurality of transfer control logic (TCL) modules, wherein each TCL module includes an interface for a dedicated external device, and wherein multiple TCL modules can communicate in parallel with their respective dedicated external devices; and a dual port memory (DPM) device that is in communication with the I/O bus, wherein the DPM device can selectively communicate data with each of the plurality of TCL modules.

In a third aspect, the invention provides an interface card adaptable into a computer system to provide communications to a plurality of external devices, wherein the interface card includes: a plurality of transfer control logic (TCL) modules, wherein each TCL module includes a system for independently interfacing with a dedicated external device; a memory device that is in communication with an I/O bus of the computer system; and control logic that provides shared communications between the memory device and the plurality of TCL modules.

BRIEF DESCRIPTION OF THE DRAWINGS

These and other features of this invention will be more readily understood from the following detailed description of the various aspects of the invention taken in conjunction with the accompanying drawings in which:

FIG. 5 depicts a memory allocation map for a PCI adapter card.

FIG. 7 depicts a memory map for TCL write transfer regions.

DETAILED DESCRIPTION OF THE INVENTION

Figure 1:
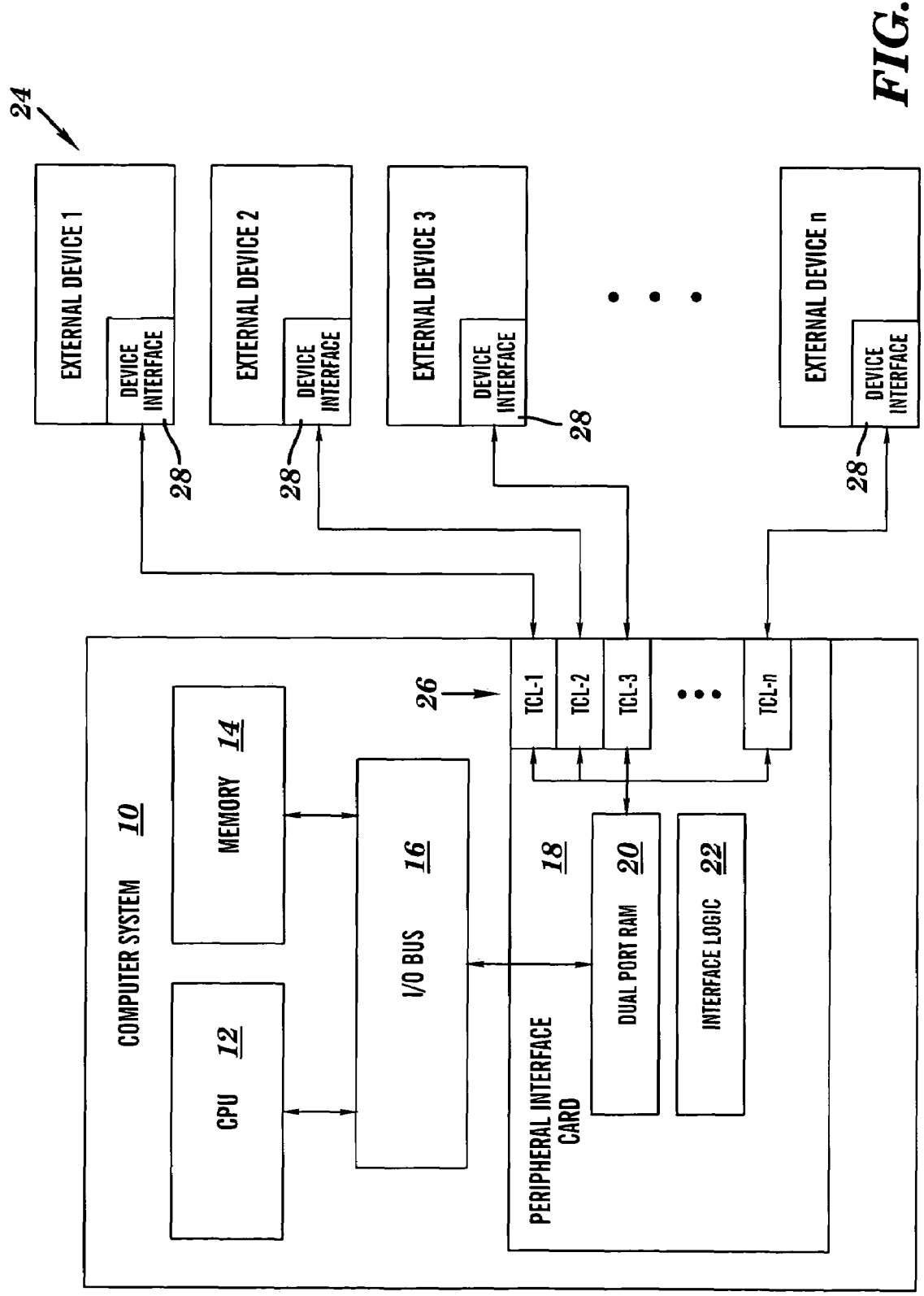
FIG. 1 depicts a computer system having a peripheral interface in accordance with the present invention.

Referring now to the drawings, FIG. 1 depicts a computer system 10 having a CPU 12, memory 14, an I/O Bus 16, and a peripheral interface card 18. CPU 12 may generally comprise any type of processor capable of executing machine instructions. Memory 14 may comprise any type of storage device, e.g., ROM, RAM, cache memory, etc., capable of storing data and or machine instructions. I/O Bus 16 comprises any input/output bus system capable of transferring data between peripheral interface card 18 and CPU 12/Memory 14. In an exemplary embodiment, I/O Bus 16 may comprise a PCI (peripheral component interconnect) bus, and peripheral interface card 18 may comprise a PCI adapter card that resides within a standard PCI slot in a personal computer. However, it should be understood that any type of I/O system that utilizes a single interface board could be utilized. As described in further detail below, the invention provides an architecture in which multiple external devices 24 are able to communicate in parallel at high speeds with the computer system's CPU 12 and memory 14 via a single peripheral interface card 18.

Each of the plurality of external devices 24 is connected to a dedicated channel on the peripheral interface card 18 with via a fixed communication path, e.g., cable, wireless channel, etc. Peripheral interface card 18 allows data to be communicated to and from the external devices 24 using multiple bi-directional parallel transfer operations. To achieve this, peripheral interface card 18 includes interface logic 22 for controlling the flow of data between external devices 24 and a dual port memory (DPM) 20. The interface logic 22 has the ability to request access to the I/O bus 16 at any time to transfer blocks of data between the DPM and the CPU 12 and memory 14.

Also included in the peripheral interface card 18 is a plurality of transfer control logic modules (TCL's) 26, labeled as TCL-1, TCL-2 ... TCL-n. Each TCL 26 includes its own control logic, memory, etc., and provides a dedicated interface for one of the external devices 24. Each TCL resides at the crux of two communication channels. The first channel provides an independent communication link between the TCL and the dedicated external device. The second channel comprises a shared communication channel for communicating with the DPM 20, in which the channel is shared with other TCL's. Each TCL has independent control of communications with its dedicated external device, and shared communications with the DPM 20.

Each TCL has various control functions related to the transfer of data to and from the external device, including a system for initiating a write transfer to its associated external device; a system for initiating a read transfer from its associated external device; and a system for handling a device initiated read transfer request from its associated external device.

In order to facilitate communications with TCL, each external device 24 includes a device interface 28 that allows high-speed bi-directional communications, using, e.g., a Fast-20 SCSI logic interface. Each device interface 28 may include a set of control, status and data lines that are defined in the same manner, so that an identical software driver can be used for each external device 24. The transfer of data to and from each external device 24 is synchronous to a clock defined by the device interface 28. In an exemplary embodiment, the device interface 28 may be defined as follows:

1. Clock The clock signal is used to time the transfer of data across the Data[7 downto 0] bus
2. Read Used by itself to initiate a register refresh operation. Used in conjunction with Write to begin a Device Initiated Read cycle.
3. Write Used by itself to initiate a write data transfer. Used in conjunction with Read to begin a Device Initiated Read cycle.
4. Data[7 downto 0] Bidirectional bus used to transfer data to and from the peripheral.
5. DataParity This provides the odd-parity bit for the Data[7 downto 0] bus.
6. ReadRequest This signal indicates to the peripheral interface card that the peripheral has data to transfer that is not provided in the register region.
7. Not Ready The peripheral asserts this signal when it is unable to accept data transmissions from the peripheral interface card.
8. Retransmit In This signal is used by the peripheral to inform the peripheral interface card that a transmission error was detected. The peripheral interface card will then retransmit the data to the peripheral.
9. Retransmit Out This signal is used by the peripheral interface card to inform the peripheral that a transmission error was detected. The peripheral will then retransmit the data to the peripheral interface card.

In this exemplary embodiment, each interface definition consists of a Clock, a Read control line, a Write control line, a Read Request line, a Device Not Ready line, a Retransmit in line, a Retransmit out line, 8 Data lines, and a Parity (Odd) line (for the 8 data lines) giving a total of 16 signals. Each signal may be transferred by a pair of wires using differential line drivers and line receivers that are compatible with the Fast-20 SCSI interface specification. The data and parity lines are bidirectional. The clock and control signals are unidirectional. The clock is set to run at a predetermined frequency, e.g., at 16.5 MHz (60.0 ns per clock cycle). The sample time for read data from the device must be adjusted to compensate for delay introduced by the cable and associated drivers. The protocol for transferring data has been designed to efficiently transfer bursts (or blocks) of data. This maximizes the available bandwidth by using only a small number of bytes for control and address information.

Specific details of the read and write data transfer protocols will be described in the sections that follow, which are described with reference to a personal computer (PC) and PCI bus configuration that uses a PCI adapter card to implement the peripheral interface card 18 for four peripheral devices. In this embodiment, one of the external devices may include a MICR (magnetic ink character recognition) device, which is commonly used in document processing systems. As noted above, it is the function of the TCLs 26 to control the data flow between the external devices 24 and the DPM 20 on the PCI adapter card (i.e., peripheral interface card 18). As described below, Data IDs are used to identify the type of data being transferred. The ID's are defined by each device and are used to denote the origin of the data or the desired destination of the data.

TCL-Initiated Write Transfer

A TCL-Initiated write transfer occurs when the TCL sends data to an external device (such as a MICR device, print device or tracking device in a check sorting system). Since data transfers in only one direction during a TCL initiated write transfer, bus turnaround cycles are not required.

Figure 2:
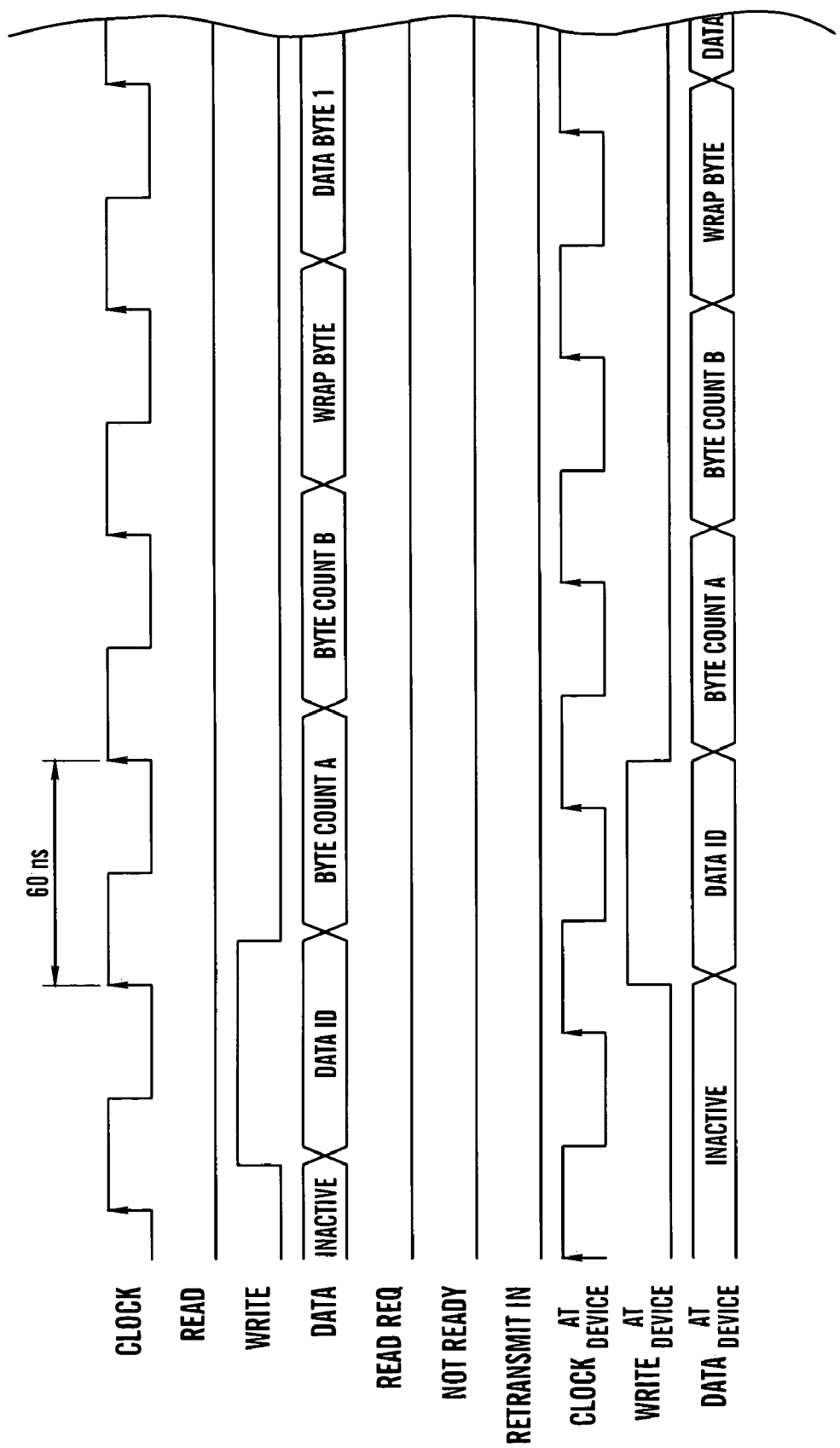
FIG. 2 depicts a timing diagram for a TCL initiated write transfer.

FIG. 2 shows the data transfer timing for a write transfer. A write data transfer from the TCL on the PCI adapter to the external device is initiated by the Write control signal going active for one clock. While the Write control is active, the desired Data ID is placed on the 9 bits of data and parity by the TCL. The receiving logic in the external device must sample the Write control signal on every rising edge of the Clock and store the Data ID when the line is detected active. The TCL then supplies the two-byte count bytes to indicate the number of bytes to be transferred, followed by the data. The receiving logic in the external device must take the byte count and ensure that the desired number of bytes were received without error.

The Not Ready control signal is supplied by the external device to alert the TCL that it is unable to start a new write transaction. This is useful when FIFO buffers are used on the TCL to store transfer data and the FIFO is currently full. The "FIFO almost full flag" may be used to indicate this condition. If the TCL does not sample the Not Ready control signal active, it will proceed to perform a TCL initiated write transfer. Asserting the Not Ready control signal during an active TCL initiated write transfer will not have any effect on the transfer and will effectively be ignored by the TCL.

The Retransmit in signal in this case is used by the external device to alert the TCL when an error is detected. The receiving device must not use the bad data. The external device should drive the Retransmit in signal active for one clock. The TCL will respond by driving the Write control signal active again and resend the data previously sent. If another error is detected, the interface may be considered broken. A bit in the general PCI adapter status register will then be set to allow the PC to poll for the error condition. If the TCL does not sample the Retransmit in signal active within four clocks of sending the last byte (checksum byte) it will consider the transfer successful and mark the particular write region as available again.

TCL-Initiated Read Transfer

A TCL-initiated read transfer occurs when the TCL requests data from an external device. Since data transfers in both directions during a TCL initiated read transfer, bus turnaround cycles are required. This type of transfer is generally used by the TCL to refresh the local copy of data in read region 0 (described below). This type of transfer cannot be directly initiated by the PC although it can be performed each time a PC-Initiated write cycle is completed.

Figure 3:
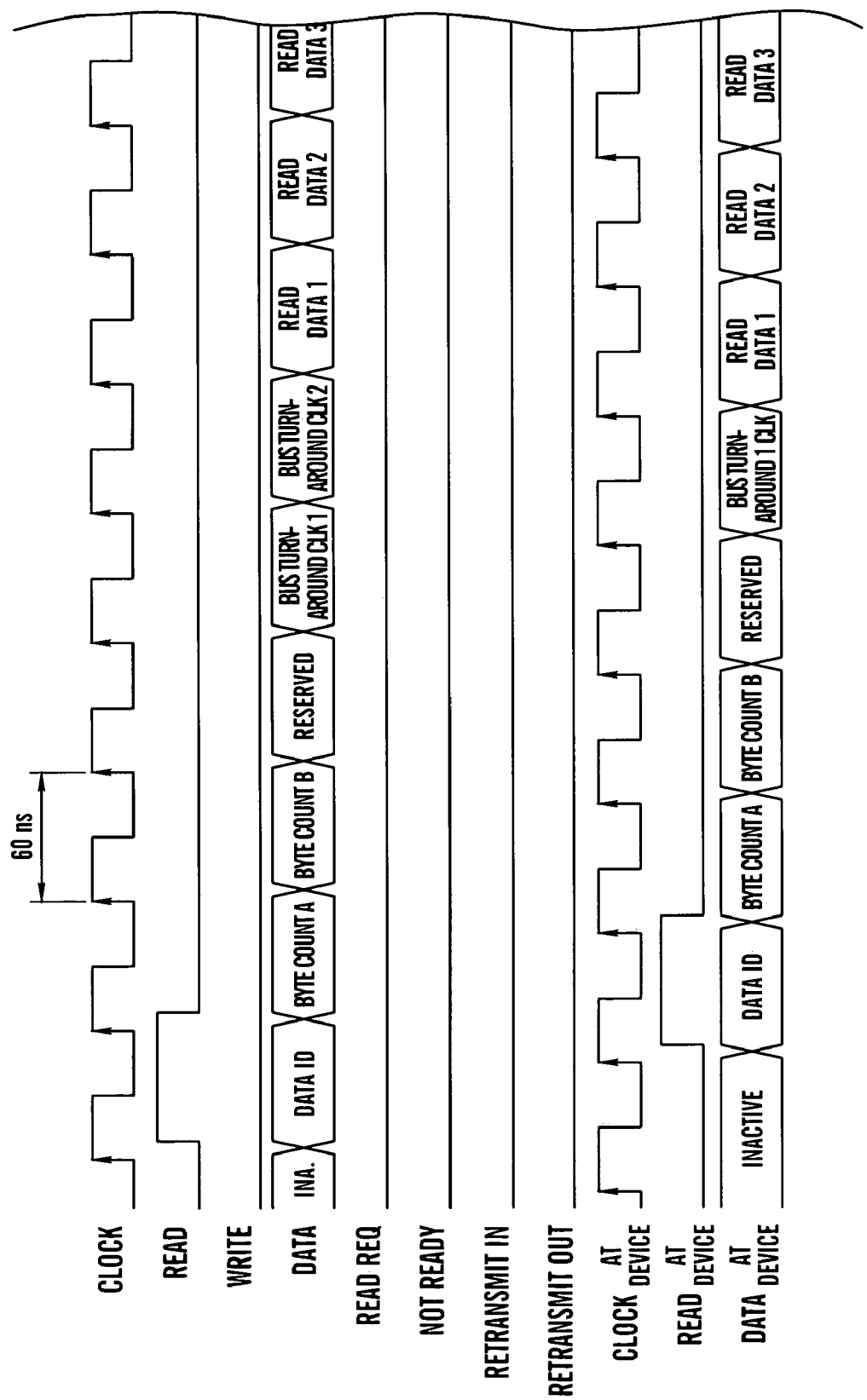
FIG. 3 depicts a timing diagram for a TCL initiated read transfer.

FIG. 3 shows the timing for a TCL-initiated read transfer. A read data transfer from the device to the TCL on the PCI adapter is initiated by the Read control signal going active for one clock. While the Read control is active, the desired Data ID is placed on the 9 bits of data and parity by the TCL. The receiving logic in the external device must sample the Read control signal on every rising edge of the Clock and store the Data ID when the line is detected active. The TCL then sends the two-byte count bytes to indicate the number of bytes it desires to transfer. The fourth byte is a reserved byte that is sent only to preserve the four-byte boundary structure. At this point, the direction of the bus must be turned around. The external device must deactivate the receivers and activate the drivers (this takes one clock cycle) with the first byte of data to be transferred, then additional bytes of data on subsequent clock cycles. The TCL must deactivate the drivers, activate the receivers and await the arrival of the read data (this takes about two clock cycles). The TCL must sample the external device supplied read data using a delayed clock that is in phase with the read data. The logic provides a means for selecting and testing this clock phase during the read clock sample delay setup procedure discussed in a later section. The receiving logic in the TCL must use the byte count and ensure that the desired number of bytes is transferred without error. After the external device sends the last byte (checksum byte), the bus must be turned around in preparation for the next bus transaction. The external device must deactivate the drivers and activate the receivers (this takes one clock cycle). The TCL must deactivate the receivers and activate the drivers (this takes one clock cycle).

As in the case of a TCL initiated write, the Not Ready control signal is used to alert the TCL that it is unable to start a new TCL initiated read transaction. If the TCL does not sample the Not Ready control signal active, it will proceed to perform a TCL initiated read transfer. Asserting the Not Ready control signal during an active TCL initiated read transfer will not have any effect on the transfer and will effectively be ignored by the TCL.

In the case of a TCL initiated read, the Retransmit in and Retransmit out signals are used by the external device and the TCL respectively to alert the other party when an error is detected. The external device should drive the Retransmit in signal active for one clock when detecting a parity error during receiving of the first four bytes of the data transfer. The TCL will immediately terminate the receiving of any data from the external device and restart the TCL initiated read transfer cycle.

In the case of a parity or checksum error detected by the TCL, the TCL will drive the Retransmit out signal active for one clock to inform the external device that an error was detected. The bad data will not be used by the TCL and the TCL will restart the TCL initiated read transfer cycle. If another error is detected, the interface must be considered broken. A bit in the general PCI adapter status register will then be set to allow the PC to poll for the error condition. If the external device does not sample the Retransmit out signal active within four clocks of sending the last byte (checksum byte) it can consider the transfer successful.

Device-Initiated Read Transfer

A device-initiated read transfer occurs when the external device requests to send data to the TCL. At the end of the transfer, an interrupt is sent to the PC if desired. This allows the external device to send urgent data to the PC (such as error conditions, MICR raw sample data, or MICR character data) and ensures that the PC is alerted that the data is available. This transaction is similar to the TCL-initiated read with the exception that the read address and byte count are supplied by the external device.

Figure 4:
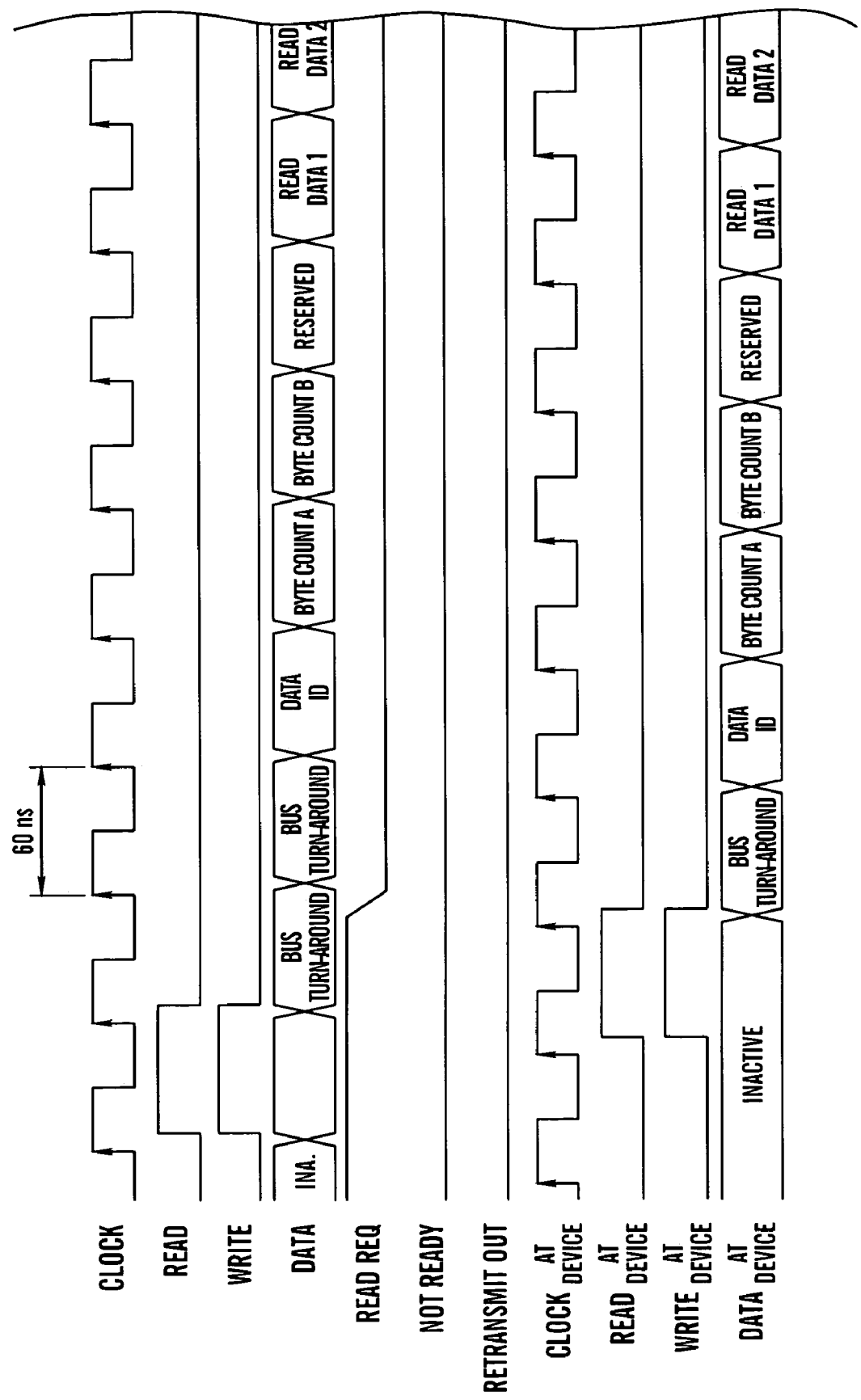
FIG. 4 depicts a timing diagram for a device initiated read transfer.

FIG. 4 shows the timing for a device-initiated read transfer. The external device alerts the TCL that urgent read data is available by asserting the Read Request signal. When the TCL is ready to accept the read data, the TCL changes the bus direction (to receive data), and drives the Read control line and the Write control line active for one clock. When the external device samples the Read and Write control lines active for one clock, the external device responds by deactivating the Read Request signal and turns the bus around (by activating the bus drivers). Note that if the TCL drives only the Read control line active for one clock, the TCL is performing a TCL-initiated read transfer and not responding to the read request. The external device must provide the read transaction data requested by the TCL and keep the Read Request signal pending until it is acknowledged. The external device must then send the read transfer record consisting of the Data ID, byte count bytes, followed by the data to be transferred. At the end of the transfer, the bus must be turned around in preparation for the next transaction. If the transfer was determined to be successful, the TCL will then initiate an interrupt to the PC (if required) to ensure that the urgent data is acknowledged.

If errors were detected during the transfer, the TCL must not interrupt the PC and must assert the Retransmit out signal for one clock. The external device must respond by reasserting the Read Request signal again and retransmitting the data. If another error is detected, the interface must be flagged as broken. A bit in the general PCI adapter status register will then be set to allow the PC to poll for the error condition. If the external device does not sample the Retransmit out signal active within four clocks of sending the last byte (checksum byte) it can consider the transfer successful.

Device Interface Reset

The PCI adapter card has the ability to reset any one of the four TCLs at anytime. When the PC performs one of these TCL resets, the TCL will in turn perform a device interface reset. This device interface reset consists of driving both the Read and Write control signals active for three clock cycles. Upon sampling this device interface reset the external device should immediately terminate the sending and receiving of any data and reset it's interface control logic.

PCI Memory Allocation

In this exemplary embodiment, a PCI Interface design is implemented using the first 64 bytes as a Type 0 version 2.1 Configuration Space Header (CSH). The first 16 bytes of the CSH actually make up the header region. These 16 bytes are used to identify the device, to control its PCI functionality and to sense the PCI status in a generic manner. The remaining 48 bytes in the configuration space are device specific. The design implements one Base Address Register 0 (BAR0). The BAR0, Command Register, Status Register and Interrupt Line register are read/write memory-mapped locations. The other locations (Device ID, Vendor ID, Class Code, Revision ID, Header Type, Latency Timer, Subsystem ID, Subsystem Vendor ID, Min_Gnt, Max_Lat and Interrupt Pin) are read only locations.

The following fields contain fixed values:
Vendor ID 0x1014
Device ID 0x01E9
Class Code
   Class Code (offset 0x0B) 0x05 (definition: Memory Controller)
   Sub-Class (offset 0x0A) 0x80 (definition: Other Memory Controller)
   Prog. I/F (offset 0x09) 0x00
Revision ID 0x01
Header Type 0x00
Latency Timer 0xFF
Subsystem ID 0x01E9
Subsystem Vendor ID 0x1014
Min_Gnt 0xFF
Max_Lat 0xFF
Interrupt Pin 0x01 (INTA#)

In this embodiment, Bit 2, the Bus Master enable bit, in the Command Register should be set to a 1 to allow the PCI adapter to function as a Bus Master.

The PCI adapter's registers are accessed via a 512K-byte block of address space that is memory-mapped. The location for this 512K-byte block of address space is defined by the Base Address Register 0 (BAR0) in the PCI adapter's CSH. BAR0 allows the system to locate the 512K-byte block anywhere in the 32-bit address space.

FIG. 5 shows how the 512K block of memory is allocated for a system supporting four external devices. The first 256K-byte block of address space is used to access a 256K byte dual-ported SRAM. This 256K-byte block is divided into two 128K-byte blocks. The first 128K-byte block is divided into four 32K byte segments. Each segment is used to transfer data to and from a specific device. Each of these 32K byte segments is further divided into two segments providing 161K-byte blocks for device read data and 161K-byte blocks for device write data.

The second 128K-byte block may be used, e.g., for the MICR sample data transfer from a MICR device to the PC. The 1K-byte block following the MICR sample data block is used to access the transfer control and status registers. These registers are used to setup and monitor the Initiator and the TCL for each device interface.

Transfer Protocol

The following sections describe an exemplary embodiment illustrating how the PC interacts with the PCI adapter to transfer data to and from the devices. In this case, a dual-ported static memory (DPM 20) is used to buffer the transferred data.

The PCI adapter contains a 64K by 36-bit asynchronous dual-ported static RAM memory (DPM). It can be accessed on one port by the back-end PCI logic and from the other port by the TCL logic. Data read and write accesses to the DPM from the back-end PCI port will be 4 bytes wide (doubleword), e.g., at 33 MHz. Data read and write accesses to the DPM from the TCL port will be 4 bytes at 16.5 MHz. The advantage of using DPM memory over conventional FIFO memory comes from the fact that PCI data transfers are sometimes terminated prematurely due to aborts, disconnects and retries. FIFO memory requires ensuring that the data is successfully transferred into the PC memory before the next doubleword is read out of the FIFO. This requires inserting wait states between each of the doubleword data transfers to verify that the data was successfully transferred, which significantly degrades the transfer data rate of the PCI adapter.

Figure 6:
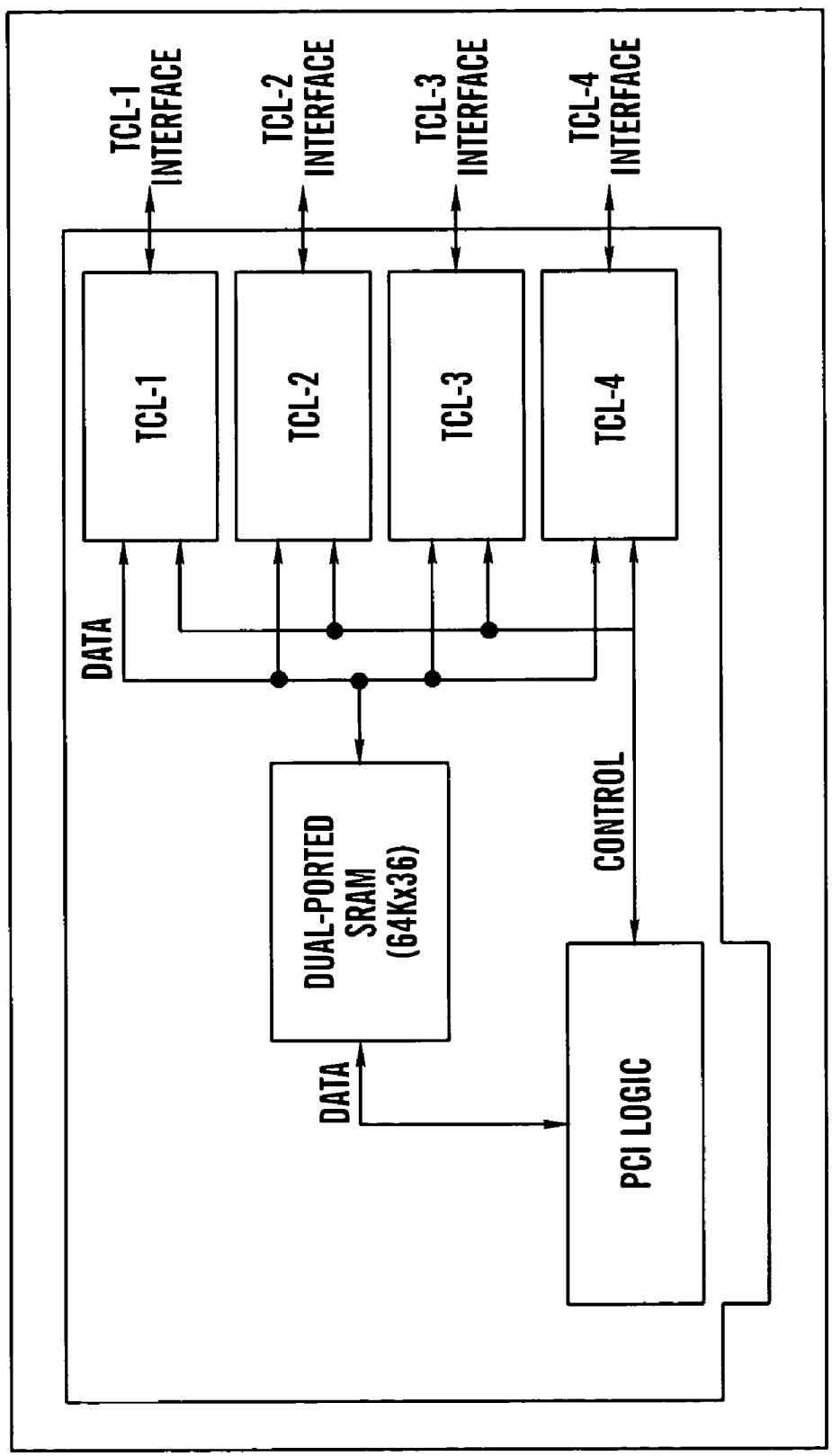
FIG. 6 depicts a peripheral interface card schematic overview.

Using DPM will allow the transfer of data from the PCI bus at a rate of 4 bytes at 33 MHz (or 133 MBytes/s). In the event the PCI transaction is terminated prematurely, the transaction can simply be repeated since the data remains available in the DPM. FIG. 6 shows a functional block diagram of the PCI adapter. The DPM is situated between the PCI logic and the TCLs for each device as described above. The data paths on each of the memory ports are 36 bits wide (32 bits plus parity for each byte) to ensure data integrity and to sustain the desired transfer rate to the PCI bus.

Access to the DPM by the TCLs will be controlled by logic that distributes the access cycles. Each TCL will be allowed one access cycle in a round-robin manner at the device transfer clock rate (16.5 MHz). Since the TCL can access 4 bytes at a time in the DPM and the transfer to and from the device is only one byte at a time, each TCL can transfer at full bandwidth with only ¼ the access bandwidth to the DPM. The round-robin access scheme greatly simplifies the shared access of the TCLs into the DPM while maintaining full transfer bandwidth to each device.

PC-Initiated Write

A PC-initiated write occurs when the PC needs to send data to an external device. The PC must first write the data into the DPM and then inform the TCL (via the TCL control register) to transfer the data to the external device.

First, the PC must select an available write transfer region in the DPM. To do this, the PC reads the desired TCL transfer region status register to determine if there are any unused regions. If none are available, the PC must either wait for one to become available, or flag this condition as an error. Transfer regions are sent to the device by the TCL in a round-robin manner starting with region 0. There are 16 available write transfer regions for each TCL as shown in FIG. 7. Each write transfer record can consist of up to 1024 bytes. The write transfer record must begin at the lowest address of the write region. The TCL will start transferring data to the device by reading data from the DPM at the write transfer region start location. (Note: The control code must be written in a manner to prevent multiple program components from attempting to write to the same memory region. The hardware is not able to detect or prevent this condition.)

Figure 8:
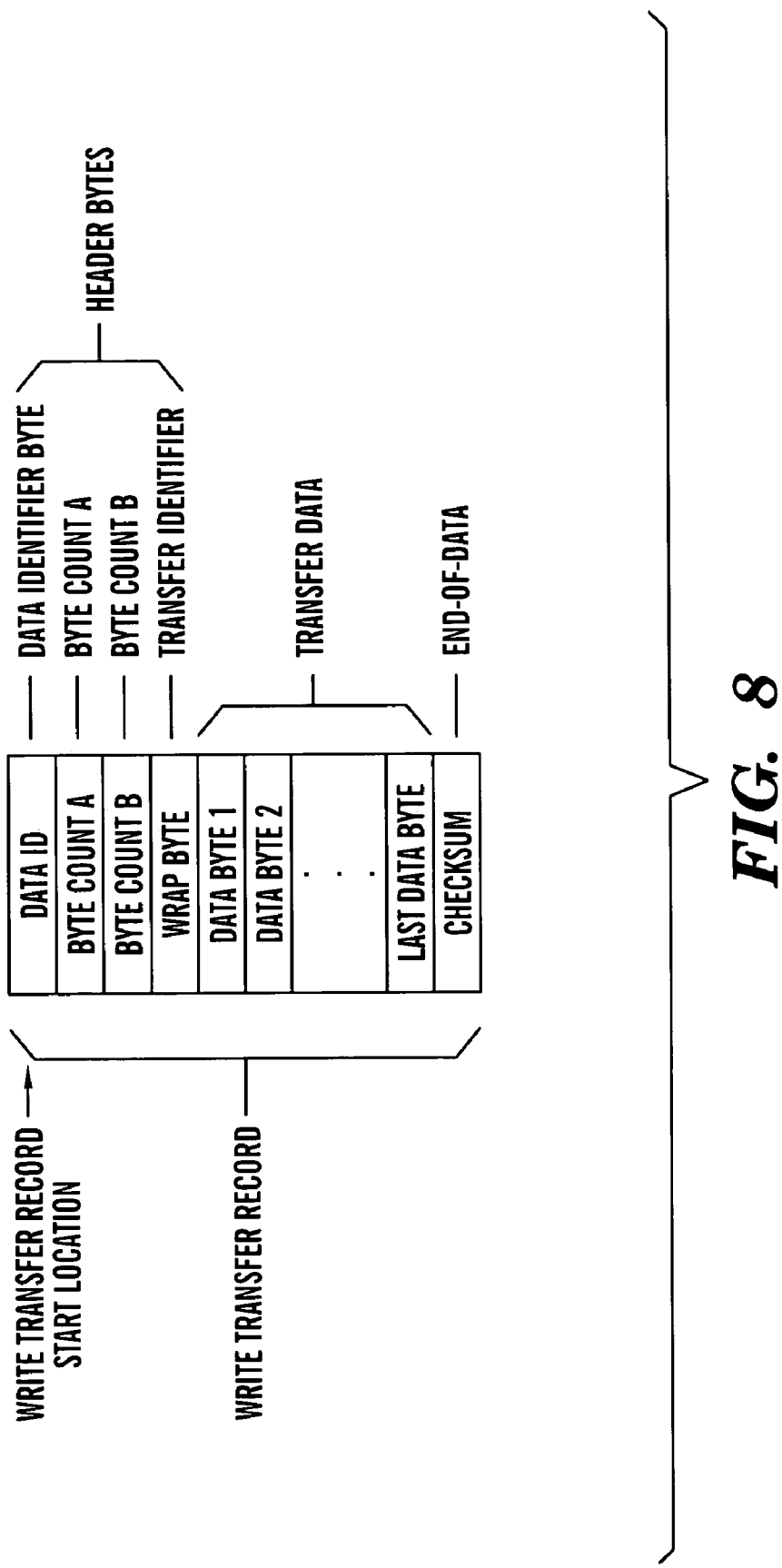
FIG. 8 depicts a structure for a write transfer record.

Next, the PC must write the write transfer record into the write transfer region. The information to be transferred to the external device from the PC is called a write transfer record. The structure of the write transfer record is shown in FIG. 8 and has the following byte definitions:

Data ID—The first byte contains the data ID which describes the type of data the TCL is transferring. The data IDs are specific to each device.

Byte Count A—The second byte contains byte count A. This byte is broken down into the following bit definitions:
LSB Bit 0—Bit 8 of the 10 bit byte count
　Bit 1—Bit 9 of the 10 bit byte count
　Bit 2—Unused
　Bit 3—Unused
　Bit 4—Multiple Write Region Identifier Bit—First
　Bit 5—Multiple Write Region Identifier Bit—Last The two multiple write region identifier bits are used to identify when write transfer records span multiple write regions. These two bits can be decoded as defined below to identify the structure (order) of the spanned multiple write regions:

| Bit 5 | Bit 4 | Definition |
| --- | --- | --- |
| 0 | 0 | Not first and not last (middle) of multiple write region transfers. |
| 0 | 1 | First of multiple write region transfers. |
| 1 | 0 | Last of multiple write region transfers. |
| 1 | 1 | First/Last (single write region transfer). |

Bit 6 - Unused
MSB Bit 7 - Unused

Byte Count B—The third byte contains byte count B. This byte represents the lower 8 bits of the 10 bit byte count. The 10 bit byte count value represents the four header bytes plus the total number of data bytes to be transferred. It does not include the checksum byte.

Wrap Byte—The fourth byte contains the wrap byte value. The wrap byte can be used as a write record transfer identifier. The contents of the wrap byte get written into the wrap register in the device. The wrap register is the last data byte in the device's read region 0 register set. The PC can ensure that the device's registers were written and the read region 0 register copies were refreshed by testing for the desired wrap register contents.

Data Bytes—The remaining bytes, except for the checksum byte at the end of the write transfer record, contain the data bytes to be transferred.

Checksum—The last byte in the write transfer record contains the value of the checksum.

The generation of this checksum is discussed in a later section.

Finally, the PC must set the write region active flag for the desired transfer region using the TCL control register. The TCL will then start transferring data to the external device starting at the first location in the write region. The PC can check the progress of the transfer by reading the write region active flag for the desired region in the TCL transfer region status register. The TCL will reset the write region active flag when the transfer to the external device is complete. An error bit will be set if the transfer was not successful.

Following the completion of the write transfer, the TCL will perform a read region 0 refresh cycle to refresh the read region 0 registers. This ensures a maximum latency of 31 microseconds (514×60 ns) for data in the read region 0 registers to be updated. This procedure allows the PC to remain in control of the data transfer process and simplifies the design of each TCL (the data content is independent from the transfer mechanism). This procedure also allows the PC to prepare multiple transfers by writing them into the DPM while previous requests are in the queue.

The design is intended to transfer bursts of data to the external device. It is recommended that all device registers be updated in a single burst. This utilizes only one of the available data IDs rather than addressing each device register individually (although the architecture supports single byte device register updates if burst updates are not possible). A copy of the write registers can be kept by the PC in a structure and the entire structure can be transferred to the external device when register updates are required.

PC-Initiated Read

A PC-initiated read is performed when the PC reads data from the DPM. All data available for the PC to read is resident on the PCI Adapter and does not require the insertion of wait states into the PCI bus transaction. The PC can read any location (for which there is valid read data) in the 257K-byte memory space at any time. There are 3 types of data for the PC to read: (1) device read region 0 register data, (2) urgent device data (from a device-initiated read), and (3) TCL status. (Please note that the PC can also read write transfer record data from the DPM if desired for diagnostic purposes. Under normal operation this would not be necessary.)

Figure 9:
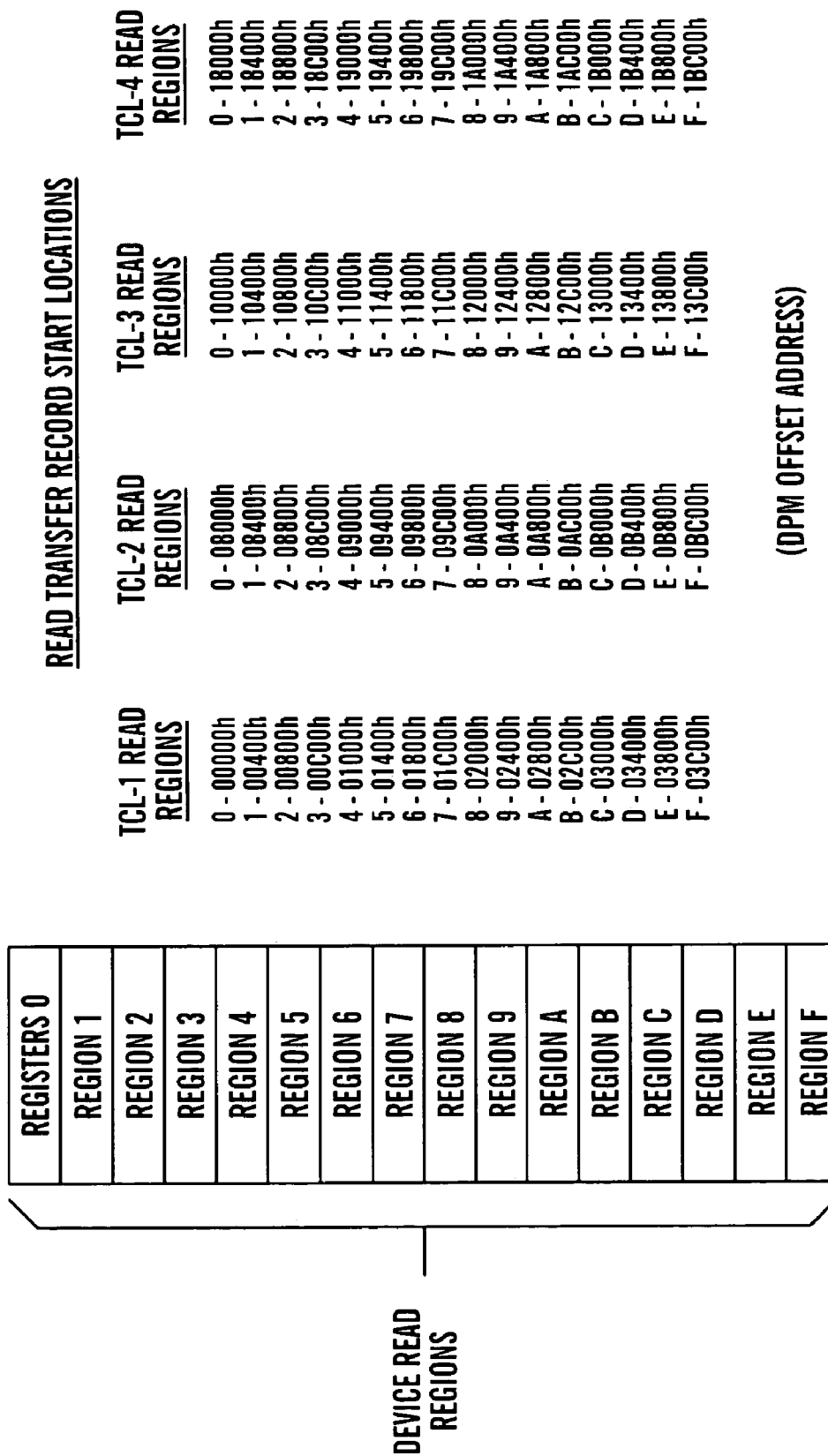
FIG. 9 depicts a memory map for TCL read region lactations.

FIG. 9 shows the TCL specific read region locations. Each TCL will update the contents of the external device registers in read region 0 under the following two conditions:

1. Anytime a PC-Initiated write is performed and the PC-Initiated write read region 0 refresh function is enabled, a read region 0 register refresh cycle for that device will be performed to update the contents of the specific device's read region 0 registers. This read region 0 register refresh cycle will take place independent of whether the read region 0 idle time refresh function is enabled or disabled for the particular TCL.
2. Anytime the specific TCLs read region 0 idle time refresh function is enabled, a read region 0 register refresh cycle will be continuously performed with a maximum refresh latency of 31 microseconds (514×60 ns). This will allow the copy of the data in the external device's read region 0 registers to reflect the current state of the device without requiring a PC-Initiated write cycle to occur to refresh these registers. Note that idle time is defined as active when the TCL samples 1) no pending active write regions requiring transfer 2) subsequently no TCL PC-initiated write read region 0 refresh transfer and 3) no pending device initiated read transfer request.

Device register contents are specific to each external device. The PC can read the data in the device's read region 0 register at any time. The PC requires no further action.

Urgent device data is placed in device read regions 1 through F by the TCL. After the PC reads a specific TCL's read region, the PC should reset the TCL's read region active flag for that particular region using TCL control register. This will free the read region and allow the TCL to use it for subsequent read data from the external device. TCL status data is located at addresses 40000h through 403FFh. The PC can read the desired registers at any time.

Device-Initiated Read (and Interrupt)

A device-initiated read (and interrupt if desired) occurs when the external device needs to send urgent data to the PC. The PC then reads the data and clears the pending interrupt (if one is set). First, the external device must alert the TCL that urgent data is available for transfer. The external device activates the Read Request interface signal. The TCL selects an available read region for the data in a round-robin manner and transfers the device data to the DPM. (Note that if device data overruns while waiting for an interrupt region to become available, the device must flag this error condition.)

Figure 10:
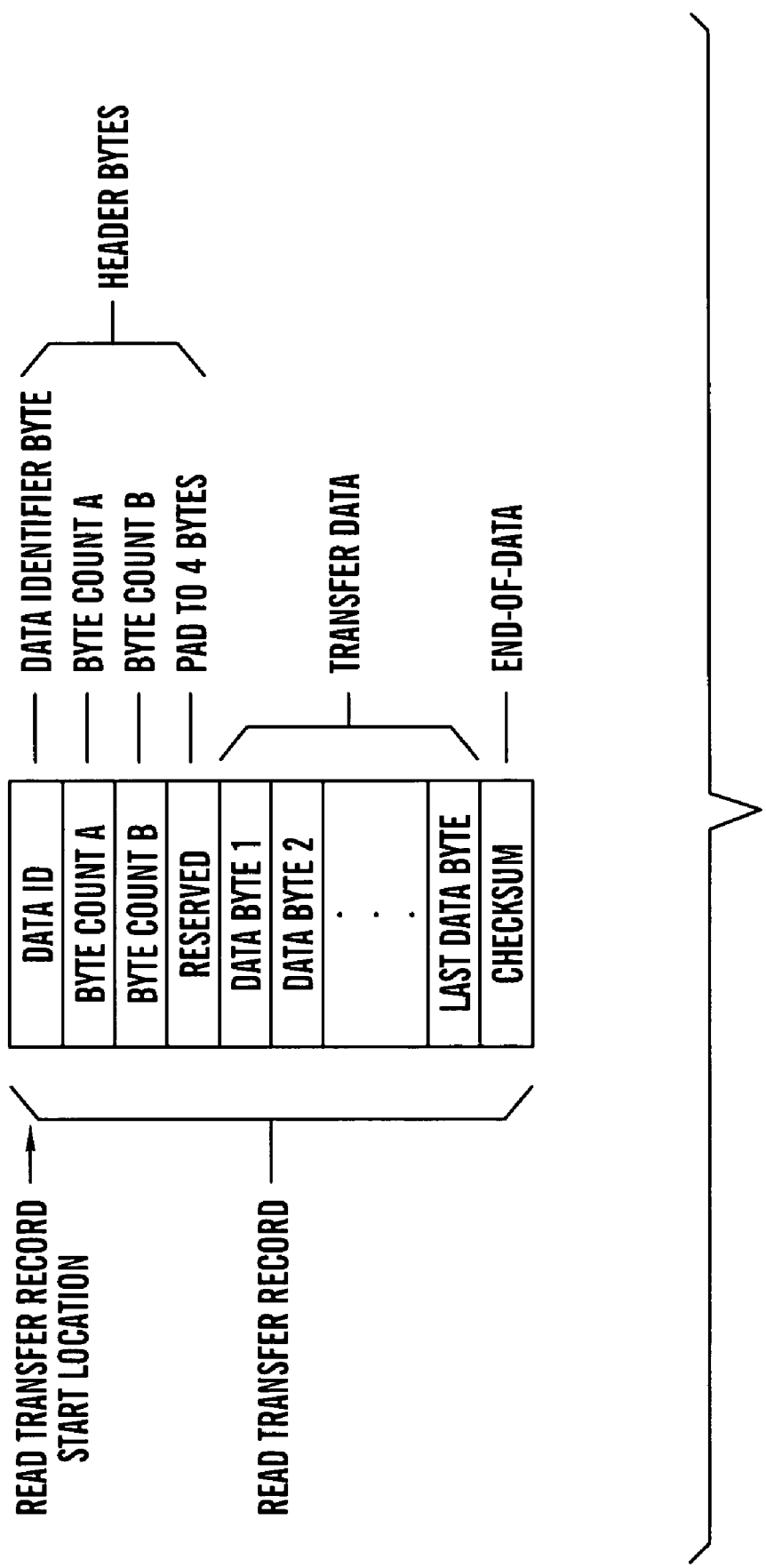
FIG. 10 depicts a structure for a read transfer record.

The data from the external device must be in the form of a read transfer record. The structure of a read transfer record is shown in FIG. 10 and has the following byte definitions:

Data ID—The first byte contains the data ID which describes the type of data the device is transferring. The data IDs are specific to each device.

Byte Count A—The second byte contains byte count A. This byte is broken down into the following bit definitions:
LSB Bit O—Bit 8 of the 10 bit byte count
  Bit 1—Bit 9 of the 10 bit byte count
  Bit 2—Unused
  Bit 3—Unused
  Bit 4—Multiple Read Region Identifier Bit—First
  Bit 5—Multiple Read Region Identifier Bit—Last The two multiple read region identifier bits are used to identify when read records span multiple read regions. These two bits can be decoded as defined below to identify the structure (order) of the spanned multiple read regions:

| Bit 5 | Bit 4 | Definition |
|---|---|---|
| 0 | 0 | Not first and not last (middle) of multiple read region transfers. |
| 0 | 1 | First of multiple read region transfers. |
| 1 | 0 | Last of multiple read region transfers. |
| 1 | 1 | First/Last (single read region transfer). |
| | | Bit 6 - MICR Sample Data Bit |

The MICR sample data bit is set only by the MICR device and used only by the MICR TCL. It informs the MICR TCL to write this particular read transfer record into the MICR sample data storage region of the DPM.

MSB Bit 7—Interrupt Request Bit

The interrupt request bit is set by the device to inform the TCL that the read transfer record is urgent. The TCL will in turn set a PCI level interrupt to the PC when the read transfer record has successfully been transferred into the DPM.

Byte Count B—The third byte contains byte count B. This byte represents the lower 8 bits of the 10-bit byte count. The 10-bit byte count value represents the four header bytes plus the total number of data bytes to be transferred. It does not include the checksum byte.

Reserved Byte—The fourth byte contains a reserved byte. The contents of this byte has no meaning with respect to the read transfer record data that is transferred and is only used to pad the header bytes to a 4 byte structure. Note however that its value is used when generating the checksum byte.

Data Bytes—The remaining bytes, except for the checksum byte at the end of the read transfer record, contain the data bytes to be transferred.

Checksum—The last byte in the read transfer record contains the value of the checksum.

When the read transfer into the DPM has completed successfully, the TCL sets the read region active flag for the read region and a PCI level interrupt is set if the interrupt request bit is on.

Next, the PC responds to the read data by first reading the TCL transfer region status register to determine which read regions contain active data. The PC then reads the data from the desired region.

Finally, the PC must reset the read region active flag for the region by writing to the TCL control register. This action frees the read region and makes it available for subsequent device read data.

TCL-Initiated Read

As discussed in a previous section, a TCL-initiated read transfer is performed when the TCL requests and receives device specific register data and then writes this data into the TCL's read region 0 memory space. The read transfer record structure for this data stream is the same as defined in FIG. 10 for the device-initiated read transfer.

Each of the four TCL's read region 0 1K byte address segments are actually divided into two 512 byte blocks. After a TCL reset is performed, the TCL will alternate (toggle) between these two 512 byte segments when performing TCL-initiated read transfers. For example, if we call bytes 0 thru 511 of TCL-1's read region 0 address space region A and bytes 512 thru 1023 of TCL-1's read region 0 address space region B, then (after a TCL-1 reset) when TCL-1 performs the first TCL-1 initiated read (read region 0 refresh cycle) it will read the first four header bytes from region A and transfer the remaining bytes from the device into region A. For the second read region 0 refresh cycle it will read the first four header bytes from region B and transfer the remaining bytes from the device into region B.

TCL-1 will continue alternating between regions A and B when performing read region 0 refresh cycles until a TCL-1 reset is performed at which time is will restart with region A again.

No requirements are put on the PC to specifically read from bytes 0 thru 511 or from bytes 512 thru 1023 of the read region 0 address space. The DPM control logic will handle this. The PC should just read from read region 0 starting at the lowest DPM offset address (TCL-1 offset address 0000h, TCL-2 offset address 2000h, TCL-3 offset address 4000h or TCL-4 offset address 6000h). The DPM control logic will perform the task of returning to the PC the read region data from the lower half (bytes 0 thru 511) of the region or the upper half (bytes 512 thru 1023) of the region. Note that bit 3 in the general PCI adapter control register has to be set to a 1 for this function to be enabled. This bit was added so that the PC could disable this function in order to read and write the entire contents of the DPM for diagnostic purposes.

The purpose of this implementation is two-fold:
1. It minimizes the chances of the PC reading read region 0 data while the TCL updates the same data. This method allows the PC to read one half of the read region 0 address space while the other half is being updated by the TCL. This provides a more consistent snapshot of the device's region 0 data for the PC to read.
2. It allows for error checking and maximizes data integrity. Since read region 0 does not have any region status flags associated with it the PC does not have to wait for a region flag to go active. It can read the contents of a particular TCL's read region 0 at any time. The advantage of having a region flag is that the TCL does not set this flag active until the data has been completely transferred and has been verified as good (i.e. no parity or checksum errors). Since the PC can read the read region 0 data at any time it is highly possible that the TCL could transfer corrupted data into read region 0 and not realize that the data was bad until the checksum error function was performed at the end of receiving the byte wide data stream. In the mean time the PC could be reading this bad data and making decisions based on its contents and things could quickly degrade from there.

Providing this left half/right half read region 0 mechanism prevents the PC from reading read region 0 data that has not been checked for parity and checksum errors. The PC is required to perform the following sequence of steps before a TCL-initiated read transfer can be performed.

1. Ensure bits 19, 18, and 17 in each of the four TCL control registers are set to zero. This will disable the TCLs from trying to inadvertly perform a TCL-initiated read transfer before the PC writes the required four header bytes into the first four bytes of the lower half and the upper half of the TCL's read region 0 memory space. This will also disable TCL error detection.
2. Ensure bit 15 in the general PCI adapter status register returns a "disabled" status to allow unaltered writing and reading of the read region 0 header bytes for verification.
3. Perform the read clock sample delay setup procedure for each TCL as discussed in a later section. This will define to the PC which device is connected to which TCL, which TCL read clock sample delay setting is to be used and the specific device's read region 0 byte count value.
4. Now that the PC has determined the specific device's read region 0 byte count value, the first four bytes (header bytes) of the device's read region 0 read transfer record are known. The PC must now write these first four bytes (Data ID, byte count B, byte count A and the reserved byte) into the first four bytes of the lower half (bytes 0 thru 511) of the TCL's read region 0 address space and also into the first four bytes of the upper half (bytes 512 thru 1023) of the TCL's read region 0 address space.
5. Once steps 1, 2, 3 and 4 above are performed, the PC should now set bits 2 and 3 in the general PCI adapter control register to 1 and can now set bits 19, 18 and 17 in each of the four TCL control registers to 1 if desired to enable the read region 0 refresh function as well as TCL error detection.

The TCL can now perform TCL-initiated read transfers to refresh the register data in the TCL's read region 0 memory space. Each time the TCL determines that it needs to perform a TCL-initiated read transfer, it will first read the first four bytes in it's read region 0 memory space and then transfer these four bytes to the device. The device will respond by sending the sending the remaining bytes of data that make up the read region 0 read transfer record back to the TCL. The TCL will in turn write this data in the TCL's read region 0 memory space starting at the next adjacent address from where the four header bytes were written to by the PC. This will produce a contiguous read region 0 read transfer record that is available for the PC to read any time it desires to. Note that the TCL will only read the first four bytes of data that the PC writes in the TCL's read region 0 memory space. The TCL will never modify this data by writing over it.

TCL Region Management

One of the functions of the TCL is to manage the selection of active write regions to transfer device write data from and to select non-active read regions to transfer device read data to. The TCL will select between read and write regions in a ping pong manner. This way there will be equal time allotted for transferring read and write data. For example, if there were two pending write region transfers, the TCL would perform the first pending write region transfer and then check the Read Request signal to see if there were any pending read region transfers (note that this only applies to read regions 1 thru F for each device. Read region 0 refresh cycles are always performed, assuming the TCL PC-initiated write read region 0 refresh function bit is enabled, after any write region transfer has occurred). If so, then the TCL would transfer the pending read region transfer and then transfer the second pending write region transfer. If after transferring the first pending write region transfer, the TCL checked and found that there were no pending read region transfers (from read regions 1 through F) then it would proceed to transfer the second pending write region transfer after performing a read region 0 register refresh cycle.

Within the read and write regions and following a TCL reset, the TCL will operate in a round robin manner starting with the lowest region (read region 1 or write region 0). It will then transfer the next read or write transfer record to or from the next available read or write region. For example, lets say there is two pending MICR read transfer records, MICR read record A and MICR read record B. The MICR TCL will check to see if MICR read region 1 is available. If MICR read region 1 is available then it will transfer MICR read record A to MICR read region 1. If MICR read region 1 is not available then it will check to see if MICR read region 2 is available. If MICR region 2 is available then it will transfer MICR read record A to MICR read region 2. If MICR read region 2 is not available then it will check to see if MICR read region 3 is available. Lets say it found MICR read region 1 and MICR read region 2 to be not available and it found MICR read region 3 to be available, so it transferred MICR read record A to MICR read region 3. Now when MICR read record B needs to be transferred, the MICR TCL will look for the next available MICR read region, MICR read region 4 to see if it is available. If MICR read region 4 is available then it will transfer MICR read record B to MICR read region 4. If MICR read region 4 is not available then it will check to see if MICR read region 5 is available . . . and so on.

Additional implementation features may include: (1) Checksum Generation; (2) TCL status flags implemented as specific (read only) registers that provide status as to which regions (read or write) contain data to be transferred from as well as which regions (read or write) are available to transfer data to; (3) TCL Error Detection and Reporting; (4) DPM Parity Error Detection and Reporting; and (5) A PCI Adapter Initiator that gives the PCI adapter the ability to request access to the PCI bus (initiate a data transfer request) at any time to transfer (burst) blocks of data between the DPM and memory locations in the PC. This capability provides an efficient means of transferring large blocks of data.

In addition, initiator control registers may be utilized to control the PCI adapter cards initiator functions. TCL control registers may be utilized to set up and control the operation of each TCL module and status registers may be utilized to indicate when a TCL read and write region contains data to transfer. TCL control registers may be used to reset the TCL, reset an interrupt, reset and set flags, define read region 0 byte count sizes, and select clock sample delay values. Other registers may be utilized as necessary to implement the invention.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A peripheral interface device that is adaptable into a computer system and which provides a communication interface for a plurality of external devices remote from the computer system, the peripheral interface device comprising:
- a plurality of transfer control logic (TCL) modules, wherein each TCL module provides a dedicated interface for an associated one of the remote external devices, and wherein multiple TCL modules can communicate in parallel with their associated remote external devices in real-time with low latency; and
- a dual port memory (DPM) device that is in communication with an input/output bus of the computer system, wherein the DPM device can selectively communicate with each of the plurality of TCL modules, wherein each of the TCL modules communicates with the DPM device in a round robin fashion.

2. The peripheral interface device of claim 1, wherein each TCL module includes a system for initiating a write transfer to its associated remote external device.

3. The peripheral interface device of claim 2, wherein the system for initiating a write transfer places a write control signal on a dedicated write control signal line connecting the TCL module to its associated remote external device.

4. The peripheral interface device of claim 3, wherein the system for initiating a write transfer further supplies a count to the remote external device to indicate a number of bytes that is to be written.

5. The peripheral interface device of claim 1, wherein each TCL module includes a system for initiating a read transfer from its associated remote external device.

6. The peripheral interface device of claim 5, wherein the system for initiating a read transfer places a read control signal on a dedicated read control signal line connecting the TCL module to its associated remote external device.

7. The peripheral interface device of claim 6, wherein the system for initiating a read transfer further supplies a count to the remote external device to indicate a number of bytes that are to be read.

8. The peripheral interface device of claim 1, wherein each TCL module includes a system for handling a read transfer request from its associated remote external device.

9. The peripheral interface device of claim 1, wherein the DPM includes a set of write transfer regions for each TCL module region, wherein each write transfer region is utilized to store data being transferred from the computer system to a target TCL module.

10. The peripheral interface device of claim 1, wherein each TCL module includes a control register for controlling data transfers between the computer system and the TCL module.

11. The peripheral interface device of claim 1, wherein the DPM stores read data available to the computer system, wherein the read data includes register data from a remote external device, urgent remote external device data, or TCL status data, wherein the urgent remote external device data is data that is necessary for the computer system to make control decisions in near real-time with low latency.

12. The peripheral interface device of claim 1, wherein each TCL includes a system for accepting urgent data from the associated remote external device, and transferring the urgent data to the DPM, wherein the urgent data is data that is necessary for the computer system to make control decisions in near real-time with low latency.

13. The peripheral interface device of claim 12, wherein the urgent data includes an interrupt signal.

14. The peripheral interface device of claim 1, wherein said peripheral interface device comprises a PCI adapter card.

15. The peripheral interface device of claim 14, wherein the input/output bus comprises a PCI bus.

16. A computer system, comprising:
- a processing unit;
- a memory;
- an I/O bus coupled to the processing unit and memory; and
- a peripheral interface device which provides a communication interface for a plurality of external devices remote from the computer system, wherein the peripheral interface device includes:
- a plurality of transfer control logic (TCL) modules, wherein each TCL module includes an interface for a dedicated remote external device, and wherein multiple TCL modules can communicate in parallel with their respective dedicated remote external devices in real-time with low latency; and
- a dual port memory (DPM) device that is in communication with the I/O bus, wherein the DPM device can selectively communicate data with each of the plurality of TCL modules, wherein each of the TCL modules communicates with the DPM device in a round robin fashion.

17. The computer system of claim 16, wherein each TCL module includes a system for initiating a write transfer to its dedicated remote external device.

18. The computer system of claim 17, wherein the system for initiating a write transfer places a write control signal on a dedicated write control signal line connecting the TCL module to its dedicated remote external device.

19. The computer system of claim 18, wherein the system for initiating a write transfer further supplies a count to the remote external device to indicate a number of bytes that is to be written.

20. The computer system of claim 16, wherein each TCL module includes a system for initiating a read transfer from its dedicated remote external device.

21. The computer system of claim 20, wherein the system for initiating a read transfer places a read control signal on a dedicated read control signal line connecting the TCL module to its dedicated remote external device.

22. The computer system of claim 21, wherein the system for initiating a read transfer further supplies a count to the remote external device to indicate a number of bytes that are to be read.

23. The computer system of claim 16, wherein each TCL module includes a system for handling a read transfer request from its dedicated remote external device.

24. The computer system of claim 16, wherein the DPM includes a set of write transfer regions for each TCL module region, wherein each write transfer region is utilized to store data being transferred from the I/O bus to a target TCL module.

25. The computer system of claim 16, wherein each TCL module includes a control register for controlling data transfers between the I/O bus and the TCL module.

26. The computer system of claim 16, wherein the DPM stores read data available to the I/O bus, wherein the read data includes register data from a remote external device, urgent remote external device data, or TCL status data, wherein the urgent remote external device data is data that is necessary for the computer system to make control decisions in near real-time with low latency.

27. The computer system of claim 16, wherein each TCL module includes a system for accepting urgent data from the dedicated remote external device, and transferring the urgent data to the DPM, wherein the urgent data is data that is necessary for the computer system to make control decisions in near real-time with low latency.

28. The computer system of claim 27, wherein the urgent data includes an interrupt signal.

29. The computer system of claim 16, wherein said peripheral interface device consists of a PCI adapter card.

30. The computer system of claim 29, wherein the I/O bus comprises a PCI bus.

31. An interface card adaptable into a computer system to provide communications to a plurality of external devices remote from the computer system, wherein the interface card includes:
    a plurality of transfer control logic (TCL) modules, wherein each TCL module includes a system for independently interfacing with a dedicated remote external device in real-time with low latency;
    a memory device that is in communication with an I/O bus of the computer system; and
    control logic that provides shared communications between the memory device and the plurality of TCL modules, wherein the memory device communicates with each of the plurality of TCL modules in a round robin manner.

32. The interface card of claim 31, wherein each TCL includes:
    means for initiating a write transfer to the dedicated remote external device;
    means for initiating a read transfer from the dedicated remote external device; and
    means for handling a read transfer from the dedicated remote external device.

* * * * *